(12) United States Patent
Naidoo et al.

(10) Patent No.: US 8,608,845 B2
(45) Date of Patent: *Dec. 17, 2013

(54) CUTBACK ASPHALT COMPOSITIONS AND PRODUCTS COMPRISING AN EXTENDER DERIVED FROM TALL OIL, AND METHODS FOR MAKING AND USING SAME

(75) Inventors: Terry Naidoo, Baton Rouge, LA (US); William E. Sonnier, Seabrook, TX (US); Rick Billings, Magnolia, TX (US)

(73) Assignee: PVS Meridian Chemicals, Inc., Detroit, MI (US)

( * ) Notice: Subject to any disclaimer, the term of this patent is extended or adjusted under 35 U.S.C. 154(b) by 160 days.

This patent is subject to a terminal disclaimer.

(21) Appl. No.: 12/350,952

(22) Filed: Jan. 8, 2009

(65) Prior Publication Data

US 2010/0170417 A1    Jul. 8, 2010

(51) Int. Cl.
*C08L 95/00*    (2006.01)
*C08L 91/00*    (2006.01)

(52) U.S. Cl.
USPC ............ 106/273.1; 106/278; 106/281.1; 106/243; 106/269; 524/59

(58) Field of Classification Search
USPC .............. 106/273.1, 277, 278, 280, 281.1, 106/123.11, 123.13, 219, 230, 231, 232, 106/234, 235, 241, 243, 268, 270, 271; 524/59, 60, 62, 68, 69, 70, 71, 77, 78; 523/402, 450, 455; 208/44

See application file for complete search history.

(56) References Cited

U.S. PATENT DOCUMENTS

| 3,556,827 | A | * | 1/1971 | McConnaughay | 106/280 |
| 3,867,162 | A | * | 2/1975 | Elste, Jr. | 106/277 |
| 4,337,193 | A | * | 6/1982 | Szita | 106/241 |
| 4,362,568 | A | * | 12/1982 | Ostermeyer | 106/277 |
| 4,373,960 | A | * | 2/1983 | Ward, Jr. | 106/241 |
| 4,433,084 | A | * | 2/1984 | Ostermeyer et al. | 524/62 |
| 4,437,896 | A | * | 3/1984 | Partanen | 106/277 |
| 4,479,827 | A | * | 10/1984 | Ward | 106/273.1 |
| 5,221,703 | A | * | 6/1993 | Ostermeyer | 524/68 |
| 8,034,172 | B2 | * | 10/2011 | Naidoo et al. | 106/273.1 |
| 2010/0147190 | A1 | * | 6/2010 | Naidoo et al. | 524/69 |
| 2010/0170417 | A1 | * | 7/2010 | Naidoo et al. | 106/278 |
| 2010/0227954 | A1 | * | 9/2010 | Naidoo et al. | 524/68 |

* cited by examiner

*Primary Examiner* — Helene Klemanski
(74) *Attorney, Agent, or Firm* — Gilbreth Roebuck, P.C.; J. M. Gilbreth

(57) ABSTRACT

Cut back asphalt compositions and product wherein the cutting solvent comprises a tall oil based solvent and optionally other renewable solvents.

20 Claims, No Drawings

CUTBACK ASPHALT COMPOSITIONS AND PRODUCTS COMPRISING AN EXTENDER DERIVED FROM TALL OIL, AND METHODS FOR MAKING AND USING SAME

RELATED APPLICATION DATA

Not applicable.

BACKGROUND OF THE INVENTION

1. Field of the Invention

The present invention relates to asphalt compositions and products, and to methods of making and using such compositions and products. In another aspect, the present invention relates to cutback asphalt compositions and products, and to methods of making and using such compositions and products. In even another aspect, the present invention relates to cutback asphalt compositions and products comprising an extender comprising renewable materials, and to methods of making and using such compositions and products. In still another aspect, the present invention relates to cutback asphalt compositions and products comprising an extender comprising tall oil based materials, and to methods of making and using such compositions and products. In yet another aspect, the present invention relates to cutback asphalt compositions and products comprising an extender comprising tall oil based materials and any other renewable material, and to methods of making and using such compositions and products.

2. Brief Description of the Related Art

Asphalt is a sticky, black and highly viscous liquid or semi-solid that is present in most crude petroleum and in some natural deposits. In U.S. terminology, asphalt (or asphalt cement) is the carefully refined residue from the distillation process of selected crude oils. Outside North America, the product is called bitumen.

Asphalt binder is a key ingredient in pavements, roofing and waterproofing applications. The primary use of asphalt is in road construction, where it is used as the glue or binder for the aggregate particles, and accounts for approximately 80% of the asphalt consumed in the United States. The most common type of flexible pavement surfacing in the United States is hot mix asphalt (HMA) that may also be known by many different names such as hot mix, asphalt concrete (AC or ACP), asphalt, blacktop or bitumen.

Increasingly, the supply of asphalt binder is becoming heavier and more viscous and this poses some substantial challenges for end users. Therefore there is an increasing need for asphalt viscosity cutters to make the applications more feasible. Two common sources of viscosity reducers are petroleum oils and waxes of various types including Fischer-Tropsch waxes, Polyethylene waxes, Montan Waxes, etc.

A cutback asphalt is a combination of asphalt cement and petroleum solvent. The petroleum solvent reduces that viscosity of the resulting cutback asphalt. Cutbacks are used because their viscosity is lower than that of neat asphalt and can thus be used in low temperature applications. After a cutback is applied the solvent evaporates away and only the asphalt cement is left. A cutback asphalt is said to "cure" as the petroleum solvent evaporates away. Cutback asphalts are typically used as prime coats and tack coats.

When used as a prime coat, the cutback asphalt is a sprayed application applied to the surface of untreated subgrade or base layers in order to fill the surface voids and protect the subbase from weather; stabilize the fines and preserve the subbase material; and/or promote bonding to the subsequent pavement layers.

When used as a tack coat, the cutback asphalt is applied between hot mix asphalt pavement lifts to promote adequate bonding. This cutback promoted adequate bonding between construction lifts and especially between the existing road surface and an overlay is critical in order for the completed pavement structure to behave as a single unit and provide adequate strength. If adjacent layers do not bond to one another they essentially behave as multiple independent thin layers—none of which are designed to accommodate the anticipated traffic-imposed bending stresses. Inadequate bonding between layers can result in delamination (debonding) followed by longitudinal wheel path cracking, fatigue cracking, potholes, and other distresses such as rutting that greatly reduce pavement life.

Asphalt binders are cut back with heavy petroleum oils to reduce viscosity for applications such as Reworked Asphalt Pavements (RAP) and known as RA Grades according to specific viscosity ranges. Traditionally, products such as Hydrolene from Sunoco Petroleum Refining and other aromatic, naphthenic and paraffinic oils are used for such applications. Such viscosity reducing petroleum oils are also used in asphalt applications for Roofing, Paving and Industrial applications and in combination with fillers and modifiers with the purpose of reducing the composite viscosity to improve workability, increase production processing line speeds and to increase levels of fillers used to improve the economics of the formulations.

However, while useful in such applications described above, cutback asphalts face economical and environmental concerns.

Economically, the uncertain and usually rising cost of petroleum solvents in many cases makes it expensive to utilize.

Environmentally, cutback asphalts contain volatile chemicals that evaporate into the atmosphere. A number of jurisdictions have banned cutback asphalts except for use at low temperatures found mostly in winter months. Another problem with cutback asphalts, especially the quick setting variety, is that the large amounts of petroleum hydrocarbon solvent added, and the volatility of the fractions used, create a fire hazard and subject workers, and those near the road, to exposure to toxic chemicals. These solvents have associated health hazards, especially with relation to the naphthenic and more so aromatic oils with the latter being classified as carcinogens through skin contact as well as vapor emissions.

U.S. Pat. No. 3,958,067, issued May 18, 1976 to Takase, et al., discloses a novel granular asphalt that comprises granules having the size of from about 0.074 to about 10 mm and being in the shape of a polyhedron having at least one acute angle. The granular asphalt has excellent properties. In particular, it can be melted rapidly and easily with small thermal capacity and slight heating, without causing thermal decomposition, denaturing and air pollution. The granular asphalt is useful, for example, for producing asphalt compound, cutback asphalt, rubberized asphalt, etc., for use in water-proofing, paving, sealing, etc., and for making asphalt block, asphalt tile, asphalt roofing, tarpaulin paper, flooring sheet, paint and varnish, etc.

U.S. Pat. No. 4,678,823, issued Jul. 7, 1987, to Jabloner, discloses spurted polyolefin fibers with improved dispersibility in hydrocarbons, which pulp can be added to cutback asphalt to form viscous compositions that can be readily sprayed, brushed and troweled with minimal pulp separation problems.

U.S. Pat. No. 5,234,494, issued Aug. 10, 1993, to Sawatzky, et al., discloses a novel asphaltic composition that consists of comminuted aged asphaltic pavement material and an effective amount, from about 2% to about 15% by weight of a blend of a soft asphalt cement, a conventional asphalt cement, or a cutback asphalt, with a nitrogen-containing, adhesion-improving, anti-stripping agent comprising a sewage sludge-derived oil, or a fraction thereof, the sewage sludge-derived oil comprising a mixture of saturated aliphatic hydrocarbons, monoaromatic hydrocarbons, diaromatic hydrocarbons, polyaromatic hydrocarbons, polar compounds and basic, pyridene-soluble compounds, having the following elemental chemical composition: nitrogen, about 3.4% to about 5% by weight; oxygen, about 5.8% to about 6.9% by weight; sulfur, about 0.3% to about 0.8% by weight; hydrogen, about 9.7% to about 10.4%, and carbon, about 76.9% to about 79.8%.

U.S. Pat. No. 6,764,542, issued Jul. 20, 2004, to Lackey, et al., discloses a biodiesel cutback asphalt and asphalt emulsion. Cutback is mixed with a sufficient amount of biodiesel to reduce the viscosity of the asphalt, producing, e.g., a cold patch material that is free of added liquid petroleum. An asphalt emulsion of fine particles of asphalt, water and, preferably, an emulsifier, can be formed which is free of added liquid petroleum.

U.S. Pat. No. 6,858,315, issued Feb. 22, 2005, to Khan, et al., discloses a low VOC asphalt primer that comprises between about 0.8 and about 45 wt. % of a halobenzotrifluoride and between about 55 and about 92 wt. % of liquid cutback asphalt normally employed in building construction and road paving and having a VOC below 200 g/l.

U.S. Pat. No. 6,987,207, issued Jan. 17, 2006, to Ronyak, discloses a hydrocarbonaceous composition comprising: (A) an odor-emitting hydrocarbonaceous material; and (B) an odor-suppressing amount of an additive composition comprising soy methyl ester, at least one aldehyde and/or at least one ketone, and at least one carboxylic acid ester in addition to the soy methyl ester. Ronyad discloses asphalt compositions for preparing seal coats that may be applied as a hot asphalt, cutback asphalt or emulsified asphalt.

All of the patents, publications, articles and/or materials cited in this specification, are herein incorporated by reference.

However, in spite of the above advancements, there still exists a need in the art for asphalt compositions and products, and to methods of making and using such compositions and products.

There exists another need in the art for cutback asphalt compositions and products comprising extenders comprising renewable materials, and to methods of making and using such compositions and products.

There exists even another need in the art for provide cutback asphalt compositions and products comprising extender comprising tall oil based materials, and to methods of making and using such compositions and products.

These and other needs in the art will become apparent to those of skill in the art upon review of this specification, including its drawings and claims.

SUMMARY OF THE INVENTION

It is an object of the present invention to provide asphalt compositions and products, and to methods of making and using such compositions and products.

It is another object of the present invention to provide cutback asphalt compositions and products comprising extenders comprising renewable materials, and to methods of making and using such compositions and products.

It is even another object of the present invention to provide cutback asphalt compositions and products comprising extenders comprising tall oil based materials, and to methods of making and using such compositions and products.

These and other objects of the present invention will become apparent to those of skill in the art upon review of this specification, including its drawings and claims.

According to one non-limiting embodiment of the present invention, there is provided a cutback asphalt comprising a petroleum asphalt and a cutter solvent derived from a tall oil product.

According to another non-limiting embodiment of the present invention, there is provided a product comprising: aggregate; and a binder comprising petroleum based asphalt and a cutter solvent comprising tall oil product; wherein the aggregate is dispersed throughout the binder.

According to even another non-limiting embodiment of the present invention, there is provided a method of extending a petroleum based asphalt comprising: contacting the petroleum based asphalt with a solvent comprising tall oil product.

According to still another non-limiting embodiment of the present invention, there is provided a method of making an cutback asphalt product comprising: forming a mixture comprising aggregate, a petroleum based asphalt and a solvent derived from tall oil material, to form an asphalt product.

DETAILED DESCRIPTION OF THE INVENTION

The present invention utilizes tall oil materials, either alone or optionally in combination with other renewable materials as extenders in cutback asphalt compositions and products.

These other renewable materials may be obtained from sugar, molasses and rice, corn and potato starches, natural tree and gum resins, natural latex rubber and vegetable oils, lignin, cellulose, palm oil waste, coconut waste, peanut oil waste, canola oil waste, potato starch, dried sewerage effluent and so on. As non-limiting examples, the extenders of the present invention may comprise tall oil materials and vegetable oil.

When the optional other renewable materials are present, the extenders of the present invention may comprise in the range of about 0.1 to about 99.1 weight percent tall oil materials, based on the weight of tall oil materials and optional renewable materials. As another non-limiting example, the extenders of the present invention may comprise in the range of about 10 to about 70 weight percent tall oil materials. As non-limiting examples, the lower end of the tall oil material weight percent range may be selected from 0.1, 1, 5, 10, 20, 30, 40, 45, 50, 60, 70, 80 and 90 weight percent, with the corresponding upper end selected from 10, 20, 30, 40, 55, 60, 70, 80, 90, 95, 99 and 99.8 weight percent, based on the weight of tall oil materials and optional renewable materials. As non-limiting examples, suitable ranges for the tall oil materials include from 1 to 20 weight percent, from 10 to 40 weight percent, from 10 to 80 weight percent.

It is believed that any known cutback asphalt composition or product may be made using the extenders comprising tall oil materials of the present invention. The known equipment and methods of making the known cutback asphalt compositions and products are believed to be sufficient for making the cutback asphalt compositions and products of the present invention.

As used herein, including the claims, "tall oil materials" includes man made and naturally occurring tall oil, tall oil pitch, tall oil blends, and similar tall oil products. Tall oil is a liquid resinous material that may be obtained in the digestion of wood pulp from paper manufacture. Commercial tall oils comprise a complex of fatty acids, resin acids, sterols, higher alcohols, waxes and hydrocarbons. The acid components also may be present as the esters thereof.

A common source of tall oil that may be used in the practice of the present invention is from pine trees. Besides cellulose, tall oil contains fatty acids, esters, rosin acids, sterols, terpenes, carbohydrates and lignin. These may be separated when wood is converted to paper pulp by the sulfide or Kraft process. The acids may then be neutralized in an alkaline digestion liquor. The mixture of rosin and fatty acid soap may be recovered by subsequent acidification that releases free rosin and fatty acids, the major constituents of tall oil.

The "Asphalt Extender" product is produced using crude tall oil (CTO) as the starting raw material via a distillation process. The purpose of the distillation of the crude tall oil is to produce various tall oil fractions (two or more) that differ in flash point and viscosity, thus affecting the end use in various tall oil applications. As a further enhancement, the tall oil fractions may be blended with other materials, such as soy bean oil, corn oil, canola (rapeseed) oil, cotton seed oil or vegetable oil esters to modify and improve properties and performance in the applications.

The CTO may be distilled in the absence of the other renewable materials with other renewable materials optionally added to this distilled CTO, or the other materials may first be added to the CTO with this mixture then distilled with even further other renewable materials optionally added after the distillation.

The tall oil materials suitable for use in the present invention product may be produced from the distillation of crude tall oil (CTO).

Various distillation cuts are obtained from CTO as follows, and may be characterized by Cleveland Open Cup ("COC") Flash Point and/or Brookfield Viscosity.

(i) Top Cut: COC Flash Point may be in the range of 180, 200 or 220 F to 300 F, 350 F or 400 F, and/or a Brookfield Viscosity at 100 F may be in the range of 20, 40, 50 or 60 to 80, 100, 150 or 200 cps, preferably 60 to 80 cps. For the top cut, generally the lower end on the range of COC flash points may be selected from 180° F., 190° F., 200° F., 210° F. and 220° F., with a corresponding higher upper end for the range of flash points selected from 300° F., 325° F., 350° F., 375° F., and 400° F. Non-limiting examples of other suitable ranges include in the range of about 220° F. to about 300 F, and even in the range of about 180° F. to about 400° F. For the top cut, generally the lower end on the range of Brookfield viscosity at 100 F may be selected from 20, 25, 30, 35, 40, 45, 50, 55 and 60 cps, with a corresponding higher upper end for the range of Brookfield viscosities selected from 80, 90, 100, 110, 120, 130, 140, 150, 160, 170, 180, 190 and 200 cps. Non-limiting examples of other suitable ranges include in the range of about 50 cps to about 100 cps, and even in the range of about 60 cps to about 80 cps.

(ii) Middle Cut: COC Flash Point may be in the range of 200 or 250 F to 350 F, 400 F, or 450 F, and/or a Brookfield Viscosity at 100 F may be in the range of 300, 400 or 500 to 2,000, 2500 or 3000 cps, preferably 900 to 1,200 cps. For the middle cut, generally the lower end on the range of COC flash points may be selected from 200° F., 210 F, 220° F., 230° F., 240° F. and 250° F., with a corresponding higher upper end for the range of flash points selected from 350° F., 375° F., 400° F., 425° F., and 450° F. Non-limiting examples of other suitable ranges include in the range of about 250° F. to about 400 F, and even in the range of about 200° F. to about 3500° F. For the middle cut, generally the lower end on the range of Brookfield viscosity at 100 F may be selected from 300, 325, 375, 400, 425, 450, 475, 500, 600, 700, 800, 900 and 1000 cps, with a corresponding higher upper end for the range of Brookfield viscosities at 100 F selected from 1200, 1500, 2000, 2250, 2500, 2750 and 3000 cps. Non-limiting examples of other suitable ranges include in the range of about 500 cps to about 2000 cps, and even in the range of about 900 cps to about 1200 cps.

(iii) Bottom Cut: COC Flash Point may be above 300 F, 350 F, 400 F, 450 F or 550 F, and/or a Brookfield Viscosity at 100 F may be in the range of 800, 1000, 1200, 1,500 to 2000, 2500, 3000, 3,500, 4500, 5000 cps, preferably 1,800 to 2,000 cps. For the bottom cut, generally the COC flash points may be selected to be above 300° F., 325° F., 350° F., 375° F., 400° F., 425° F., 450° F., 475° F., 500° F. and 550° F. For the bottom cut, generally the lower end on the range of Brookfield viscosity at 100 F may be selected from 800, 850, 900, 950, 1000, 1100, 1200, 1300, 1400 and 1500 cps, with a corresponding higher upper end for the range of Brookfield viscosities at 100 F selected from 2000, 2250, 2500, 2750, 3000, 3250, 3500, 3750, 4000, 4250, 4500, 4750, 5000 cps. Non-limiting examples of other suitable ranges include in the range of about 500 cps to about 2000 cps, and even in the range of about 900 cps to about 1200 cps.

In the practice of the present invention, asphalt may be extended with any one of, two of; or three of the Top Cut, Middle Cut and Bottom Cut. Any desired weight percentages of the top cut, middle cut and bottom cut may be utilized depending upon the end use application. The combination of the top, middle and bottom cuts may come some the same or different starting CTOs. That is, one or more CTO's may be utilized to obtain the one or more top, middle and bottom cuts.

In some non-limiting embodiments of the present invention, the CTO Top Cut may be used as a viscosity reducing agent in asphalt used for emulsification and where high levels of filler are required such as in binder composites used for all forms of roofing applications (shingles, roofing underlay, coatings to substrates, built up roofing (BUR), mopping roofing grades, flexible roofing rolls, etc.

In some non-limiting embodiments of the present invention, the CTO Top Cut may be used as a carrier solvent for detergents and emulsifiers.

In other non-limiting embodiments of the present invention, the CTO Top Cut may be used in pavement emulsions for surface dressings and maintenance products (slurry seals, chip seals, fog seals, rejuvenating sprays, tack coats, cut-back patch mixes, cold mixes, crack sealants, and joint sealants, etc.).

In even other non-limiting embodiments of the present invention, the CTO Middle Cut may be used in roofing applications as described above where a higher flash point is the requirement.

In still other non-limiting embodiments of the present invention, the CTO Middle cut may be used in pavement applications as described above where a higher flash point is the requirement.

In some non-limiting embodiments of the present invention, the CTO Middle Cut may be used as a carrier solvent for detergents and emulsifiers.

In yet other non-limiting embodiments of the present invention, the CTO Bottom Cut may be used in roofing applications as described above where more a stringent flash point is required.

In even still other non-limiting embodiments of the present invention, the CTO Bottom Cut may be used in pavement applications as described above where a more stringent flash point is required.

In even yet other non-limiting embodiments of the present invention, the CTO Bottom Cut may be used in Hot Mix and warm Mix applications to produce Reworked Asphalt (RA) Grades of binders for specific stiffness of RAP mixes used.

In still even other non-limiting embodiments of the present invention, the CTO Bottoms may be used to reduced the viscosity of modified or unmodified asphalt binders for pavement, roofing and industrial applications to improve workability at lower temperatures, increase production line speeds and increase the levels of inert fillers in the formulation.

Also, the CTO Bottoms may be used as a carrier solvent for detergents and emulsifiers.

In still yet other non-limiting embodiments of the present invention, all three CTO Cuts may be used in producing hard asphalt binders by diluting Trinidad Lake Asphalt (or any natural asphalt), Gilsonite and coker bottoms form refineries to meet any target viscosity, penetration and softening point specifications.

In yet even other non-limiting embodiments of the present invention, all three CTO Cuts can be used to adjust the penetration and softening point value of hard asphalts from natural or refinery sources.

In yet still other non-limiting embodiments of the present invention, all three CTO cuts are powerful solvents for the incorporation of roofing shingles and reworked asphalt pavement (RAP) into asphalt pavement mixes at any level of incorporation.

In some non-limiting embodiments of the present invention, the extenders will be selected to provide the necessary solubility for the end use asphalt application. The extenders may function as a diluent for the asphalt binder, and as a non-limiting example, may provide 100% miscibility with 0% separation for the temperature range from about 30 F to about 500 F, or perhaps even higher temperatures.

In some non-limiting embodiments of the present invention, the extenders of the present invention may be useful for extending the low temperature performance of asphalt binders. As a non-limiting example, the extenders of the present invention may be formulated to provide suitable flexibility and malleability such that low temperature cracking is prevented or reduced. As another non-limiting example, the extenders of the present invention softens the top end and lowers the bottom end of the asphalt, and may extend the BBR number of the asphalt to a lower grade.

The extenders of the present invention may comprise in the range of about 0.1 to about 99.1 weight percent tall oil materials, based on the weight of tall oil materials and optional renewable materials. As another non-limiting example, the extenders of the present invention may comprise in the range of about 10 to about 70 weight percent tall oil materials. As non-limiting examples, the lower end of the tall oil material weight percent range may be selected from 0.1, 1, 5, 10, 20, 30, 40, 45 weight percent, with the corresponding upper end selected from 55, 60, 70, 80, 90, 95, 99 and 99.8 weight percent, based on the weight of tall oil materials and optional renewable materials.

Various additives may be optionally utilized in the present invention. Non-limiting examples of suitable additive include viscosity control agents, lubricity agents, flowability agents, colorants, reinforcing agents, waxes, fibers, matting, fabric, surfactants, wetability agents, anti-skid agents, reflective additives, cross-linking agents, anti-strip agents, emulsifier, mineral additives, fillers, polymers, aqueous solutions, antifoaming agents, dispersing agents, mixing agents, compatibilizers, water repellents, reflective agents, UV light stabilizers, solvent resistant agents, herbicides, insecticides, antimold/fungal agents, and antibacterial agents. Each of these various additives may be present in the range of about 0.1 to about 30 weight percent of the asphalt material.

"Aggregate" is a collective term for the mineral materials such as sand, gravel and crushed stone that are used with the asphalt binding medium to form compound materials. By volume, aggregate generally accounts for 92 to 96 percent of holt mix asphalts. Aggregate is also used for base and subbase courses for both flexible and rigid pavements.

Aggregates can either be natural or manufactured. Natural aggregates are generally extracted from larger rock formations through an open excavation (quarry). Extracted rock is typically reduced to usable sizes by mechanical crushing. Manufactured aggregate is often the byproduct of other manufacturing industries.

The asphalts of the present invention may include virgin aggregate, reused/recycled asphalt pavement (RAP), recycled roofing shingles, ground tire rubber, in any combination in any suitable amount.

As a non-limiting example, the asphalts of the present invention may comprise in the range of about 1 to about 70 weight percent extender, based on the weight of extender and asphalt binder. As another non-limiting example, the asphalts of the present invention may comprise in the range of about 10 to about 50 weight percent extender. As non-limiting examples, the lower end of the extender weight percent range may be selected from 0.1, 1, 5, 7.5, 10, 20, 30, 40, 45, 50, 60, 70, 80 and 90 weight percent, with the corresponding upper end selected from 5, 10, 20, 25, 30, 40, 45, 50, 55, 60, 70, 80, 90, 95, 99 and 99.9 weight percent, based on the weight of tall oil materials and optional renewable materials. As non-limiting examples, suitable ranges for the extenders include from 1 to 25 weight percent, from 1 to 50 weight percent, from 7.5 to 20 weight percent, and from 10 to 80 weight percent.

EXAMPLES

The following non-limiting examples are provided merely to illustrate the present invention and are not meant to limit the scope of the claims in any manner.

These examples were carried out utilizing a single stage wiped film evaporator, making two passes to produce the resulting three distillation cuts. As an example, however, all three cuts could be produced in a single pass distillation column with the middle cut taken as a side draw.

Initial run conditions (to produce the first distillate overhead cut) in the wiped film evaporator were 165° C. at a vacuum of 200 microns. Certainly, less vacuum could be used if higher run temperatures are used. The exact equipment used will determine the actual run conditions.

The following are typical operating ranges to produce the various fractions.

1st Distillation Pass (produces the first distillate cut or CTO Top Cut and feed for the second pass)
  Temperature: 150° C. to 225° C.
  Operating Pressure: 100 microns to 2,000 microns
  Material Balance Produce a 5% to 25% (weight percent) overhead (light) fraction, based on CTO feed.

2nd Distillation Pass (produces the second distillate cut, or CTO Middle Cut, and a final heavy or CTO Bottoms).
  Temperature: 200° C. to 300° C.
  Operating Pressure: 100 microns to 2,000 microns
  Material Balance: Produce a 5% to 25% (weight percent) overhead (light) fraction, based on CTO feed.

Hydrolene is a very commonly used asphalt extender. The following presents absolute viscosity data demonstrating viscosity cutting ability of distilled CTO asphalt diluent.

|  | Valero Base PG 67-22 | Base Plus 7.5% Hydrolene H90T | Base Plus 7.5% D CTO Diluent |
|---|---|---|---|
| Absolute Viscosity at 60 C., Poise Method AASHTO T202 | 3,287 | 1,427 | 1,322 |

Above data demonstates that distilled CTO Asphalt Diluent has superior viscosity cutting ability over Hydrolene H90T.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

We claim:

1. A cutback asphalt comprising a petroleum asphalt and a cutter solvent derived from a tall oil product, wherein at least a portion of the tall oil product is oxidized.

2. The cutback asphalt of claim 1, wherein the solvent comprises as least one selected from the group consisting of a crude tall oil distilled top cut having a COC Flash Point 220° F. to 300° F. or a Brookfield Viscosity at 100° F. in the range of 50 to 100 cps, a crude tall oil distilled middle cut having a COC Flash Point 250° F. to 400° F. or a Brookfield Viscosity at 100° F. in the range of 500 to 2,000 cps, and a crude tall oil distilled bottom cut having a COC Flash Point above 400° F. or a Brookfield Viscosity at 100° F. in the range of 1,500 to 3,500 cps.

3. The cutback asphalt of claim 1, wherein the solvent comprises as least two selected from the group consisting of a crude tall oil distilled top cut having a COC Flash Point 220° F. to 300° F. or a Brookfield Viscosity at 100° F. in the range of 50 to 100 cps, a crude tall oil distilled middle cut having a COC Flash Point 250° F. to 400° F. or Brookfield Viscosity at 100° F. in the range of 500 to 2,000 cps, and a crude tall oil distilled bottom cut having a COC Flash Point above 400° F. or Brookfield Viscosity at 100° F. in the range of 1,500 to 3,500 cps.

4. The cutback asphalt of claim 1, wherein the solvent comprises a crude tall oil distilled top cut having a COC Flash Point 220° F. to 300° F. or a Brookfield Viscosity at 100° F. in the range of 50 to 100 cps, a crude tall oil distilled middle cut having a COC Flash Point 250° F. to 400° F. or Brookfield Viscosity at 100° F. in the range of 500 to 2,000 cps, and a crude tall oil distilled bottom cut having a COC Flash Point 400° F. to above 550° F. or Brookfield Viscosity at 100° F. in the range of 1,500 to 3,500 cps.

5. The cutback asphalt of claim 1 wherein the solvent is about 1 to about 50 wt % of the cutback asphalt, based on the weight of the petroleum asphalt and cutter solvent.

6. The cutback asphalt of claim 1 wherein the solvent is about 1% to about 25 wt % of the cutback asphalt, based on the weight of the petroleum asphalt and cutter solvent.

7. The cutback asphalt of claim 1 wherein the solvent is about 7.5 to about 20 wt % of the cutback asphalt, based on the weight of the petroleum asphalt and cutter solvent.

8. The cutback asphalt product of claim 1, further comprising at least one selected from the group consisting of viscosity control agents, lubricity agents, flowability agents, colorants, reinforcing agents, waxes, fibers, matting, fabric, surfactants, wetability agents, anti-skid agents, reflective additives, cross-linking agents, anti-strip agents, emulsifier, mineral additives, fillers, polymers, aqueous solutions, anti-foaming agents, dispersing agents, mixing agents, and compatibilizers.

9. A product comprising:
    Aggregate; and
    A binder comprising petroleum based asphalt and a cutter solvent comprising tall oil product;
        wherein the aggregate is dispersed throughout the binder, and wherein at least a portion of the tall oil product is oxidized.

10. The product of claim 9, wherein the solvent comprises as least one selected from the group consisting of a crude tall oil distilled top cut having a COC Flash Point 220° F. to 300° F. or Brookfield Viscosity at 100° F. in the range of 50 to 100 cps, a crude tall oil distilled middle cut having a COC Flash Point 250° F. to 400° F. or Brookfield Viscosity at 100° F. in the range of 500 to 2,000 cps, and a crude tall oil distilled bottom cut having a COC Flash Point above 400° F. or Brookfield Viscosity at 100° F. in the range of 1,500 to 3,500 cps.

11. The product of claim 9, wherein the solvent comprises as least two selected from the group consisting of a crude tall oil distilled top cut having a COC Flash Point 220° F. to 300° F. or Brookfield Viscosity at 100° F. in the range of 50 to 100 cps, a crude tall oil distilled middle cut having a COC Flash Point 250° F. to 400° F. or a Brookfield Viscosity at 100° F. in the range of 500 to 2,000 cps, and a crude tall oil distilled bottom cut having a COC Flash Point above 400° F. or Brookfield Viscosity at 100° F. in the range of 1,500 to 3,500 cps.

12. The product of claim 9, wherein the solvent comprises a crude tall oil distilled top cut having a COC Flash Point 220° F. to 300° F. or a Brookfield Viscosity at 100° F. in the range of 50 to 100 cps, a crude tall oil distilled middle cut having a COC Flash Point 250° F. to 400° F. or a Brookfield Viscosity at 100° F. in the range of 500 to 2,000 cps, and a crude tall oil distilled bottom cut having a COC Flash Point 400° F. to above 550° F. or Brookfield Viscosity at 100° F. in the range of 1,500 to 3,500 cps.

13. The product of claim 9, wherein the solvent is about 1 to about 50 wt % of the cutback asphalt, based on the weight of the petroleum asphalt and cutter solvent.

14. The product of claim 9, wherein the solvent is about 1% to about 25 wt % of the cutback asphalt, based on the weight of the petroleum asphalt and cutter solvent.

15. The product of claim 9, wherein the solvent is about 7.5 to about 20 wt % of the cutback asphalt, based on the weight of the petroleum asphalt and cutter solvent.

16. The product of claim 9, further comprising at least one selected from the group consisting of viscosity control agents, lubricity agents, flowability agents, colorants, reinforcing agents, waxes, fibers, matting, fabric, surfactants, wetability agents, anti-skid agents, reflective additives, cross-linking agents, anti-strip agents, emulsifier, mineral additives, fillers, polymers, aqueous solutions, anti-foaming agents, dispersing agents, mixing agents, and compatibilizers.

17. A method of extending a petroleum based asphalt comprising:
    contacting the petroleum based asphalt with a solvent comprising tall oil product, wherein at least a portion of the tall oil product is oxidized.

18. The method of claim 17, wherein the solvent comprises as least one selected from the group consisting of a crude tall oil distilled top cut having a COC Flash Point 220° F. to 300° F., Brookfield Viscosity at 100° F. in the range of 50 to 100 cps, a crude tall oil distilled middle cut having a COC Flash Point 250° F. to 400° F., Brookfield Viscosity at 100° F. in the range of 500 to 2,000 cps, and a crude tall oil distilled bottom cut having a COC Flash Point above 400° F., Brookfield Viscosity at 100° F. in the range of 1,500 to 3,500 cps.

19. The method of claim 17, wherein the solvent comprises as least two selected from the group consisting of a crude tall oil distilled top cut having a COC Flash Point 220° F. to 300° F., Brookfield Viscosity at 100° F. in the range of 50 to 100 cps, a crude tall oil distilled middle cut having a COC Flash Point 250° F. to 400° F., Brookfield Viscosity at 100° F. in the range of 500 to 2,000 cps, and a crude tall oil distilled bottom cut having a COC Flash Point above 400° F., Brookfield Viscosity at 100° F. in the range of 1,500 to 3,500 cps.

20. The method of claim 17, wherein the solvent comprises a crude tall oil distilled top cut having a COC Flash Point 220° F. to 300° F., Brookfield Viscosity at 100° F. in the range of 50 to 100 cps, a crude tall oil distilled middle cut having a COC Flash Point 250° F. to 400° F., Brookfield Viscosity at 100° F. in the range of 500 to 2,000 cps, and a crude tall oil distilled bottom cut having a COC Flash Point 400° F. to above 550° F., Brookfield Viscosity at 100° F. in the range of 1,500 to 3,500 cps.

\* \* \* \* \*